Oct. 21, 1952 — N. E. HART — 2,614,826
TARE OFFSETTING MECHANISM
Filed Nov. 9, 1949 — 2 SHEETS—SHEET 1
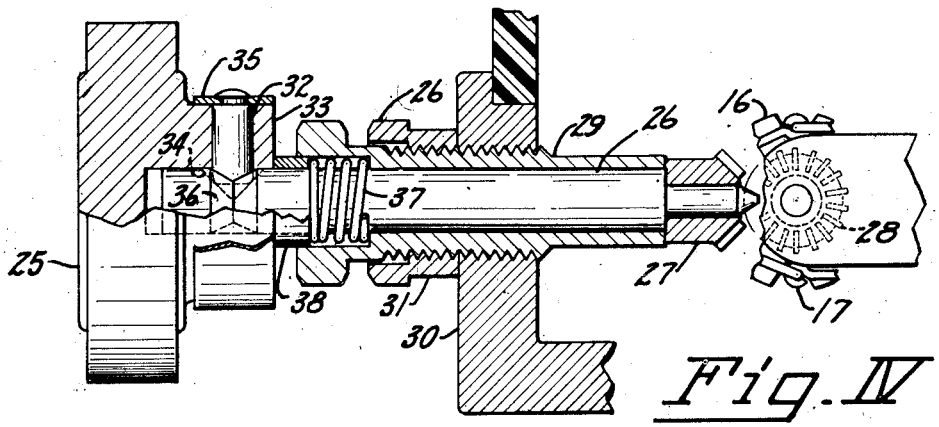
Fig. IV
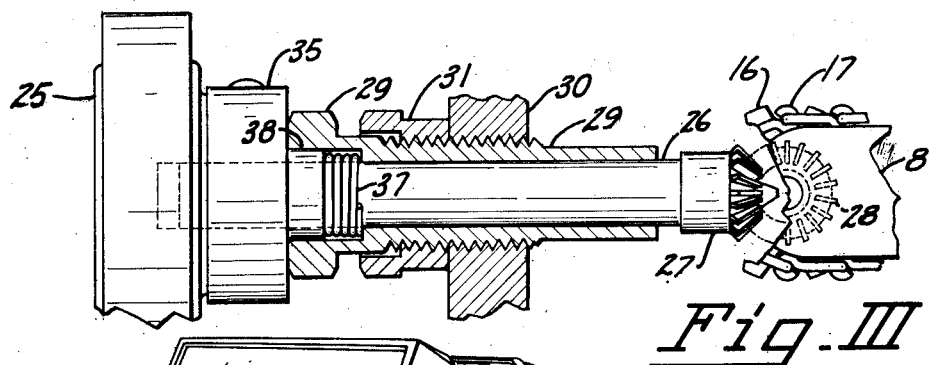
Fig. III
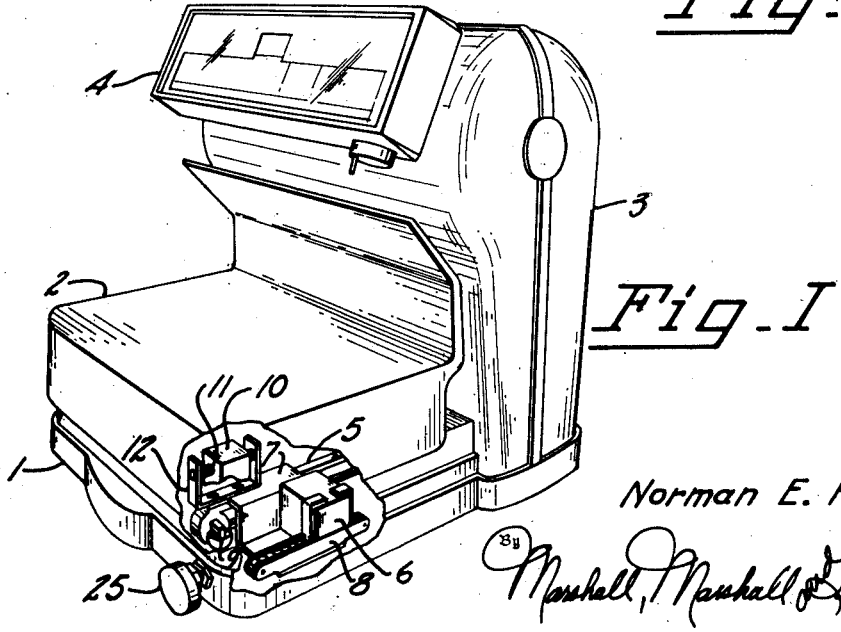
Fig. I
Inventor
Norman E. Hart
By Marshall, Marshall & Leonard
Attorneys

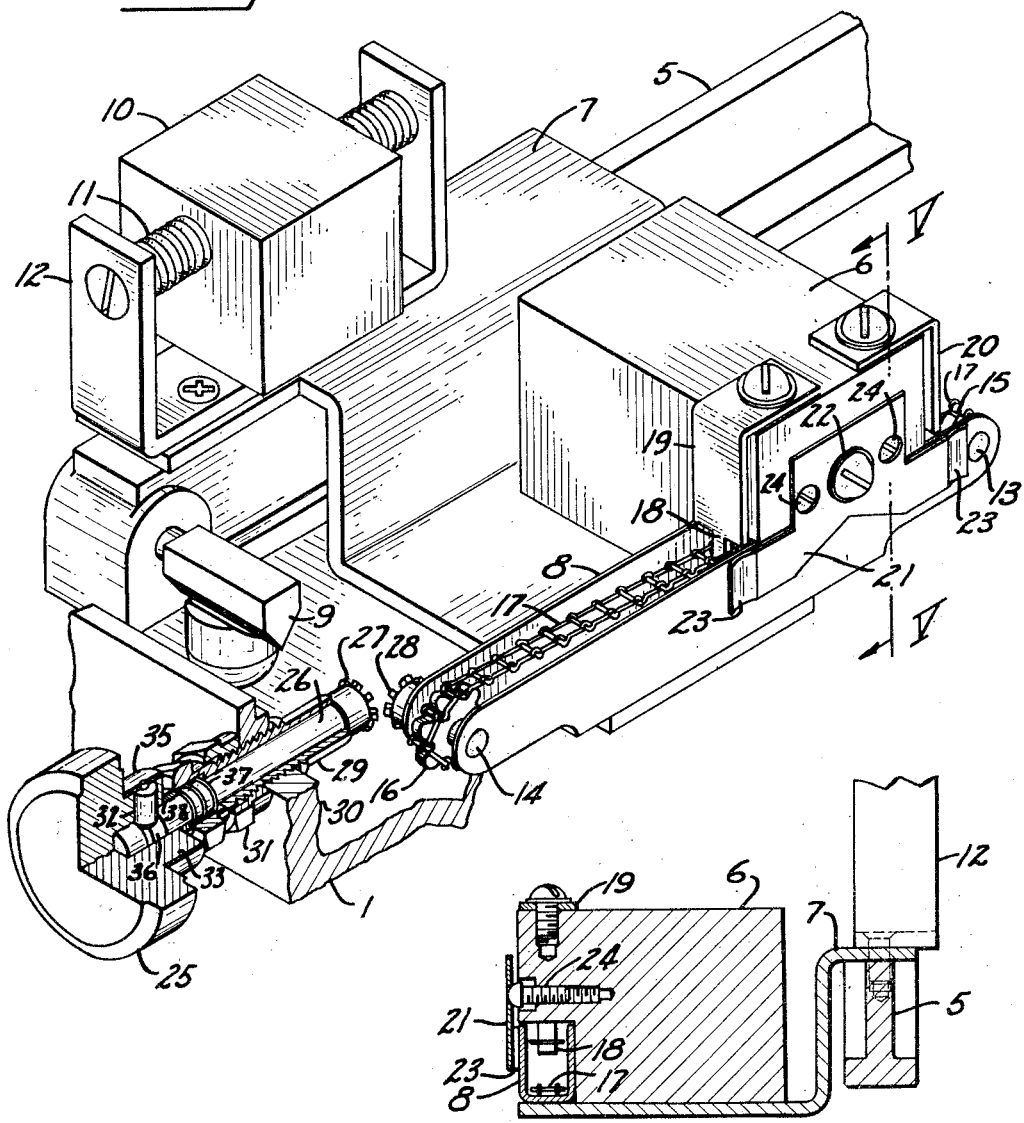

Patented Oct. 21, 1952

2,614,826

UNITED STATES PATENT OFFICE 2,614,826

TARE OFFSETTING MECHANISM

Norman E. Hart, Toledo, Ohio, assignor to Toledo Scale Company, Toledo, Ohio, a corporation of New Jersey Application November 9, 1949, Serial No. 126,357

5 Claims. (Cl. 265—56.5)

This invention relates to tare offsetting devices for weighing scales and in particular to a compact arrangement that may be employed in the limited space within the housing of a counter-type weighing scale.

Weighing scales intended for use on counters in meat markets and grocery stores are usually designed to be as compact as possible. This compactness of design makes it extremely difficult to incorporate any of the usual tare offsetting mechanisms so that the weight of a container placed on the scale may be offset and the net weight indicated on the weighing scale chart.

The principal object of this invention is to provide a tare offsetting mechanism that is sufficiently compact to be installed in a weighing scale housing and which may be so installed without modification or alteration of the weighing scale mechanism itself.

Another object of the invention is to provide a drive for a tare offsetting mechanism which drive may be operated without applying any force to the weighing mechanism.

A still further object of the invention is to provide an actuating mechanism for the tare offsetting device that is arranged such that it is out of contact with movable portions of the scale mechanism at all times except when a change in tare adjustment is being made.

More specific objects and advantages are apparent from the following description of a preferred embodiment of the invention.

According to the invention a tare offsetting weight is slidably mounted on a plate attached to a lever of the scale and the weight is driven by a mechanism including beveled gears having their points of contact located generally on the fulcrum axis of the lever. A shaft journaled in the base of the scale carries one of the bevel gears and this shaft is axially slidable so that it may be urged in one direction against the force of a spring to engage the beveled gear carried thereon with the mating gear for driving the tare offsetting weight. As soon as the weight has been moved to its tare offsetting position and the shaft is released, the gears are disengaged so that the driving mechanism cannot influence the indication of weight of the scale. The invention also includes features of construction that make possible the compactness of the device and its ease of operation.

A preferred embodiment of the invention is illustrated in the accompanying drawings.

In the drawings:

Figure I is a perspective view of a weighing scale incorporating the improved tare offsetting device.

Figure II is an enlarged isometric view of the tare offsetting device that appears in the broken away section of Figure I.

Figures III and IV are enlarged vertical sections of the manually operable portion of the tare adjusting mechanism showing its mounting in the housing and its cooperation with the chain drive of the tare offsetting weight.

Figure V is a vertical section taken through the track and tare offsetting weight to show the detail of construction of these members.

These specific drawings and the accompanying description are intended merely to illustrate the invention but not to limit its scope.

A weighing scale embodying the invention includes a base 1, a load receiver 2 positioned over a forward portion of the base 1 and a column 3 erected from the rear portion of the base and adapted to enclose load counterbalancing and indicating mechanism. The indications of load are visible through a magnifying reading device 4 mounted on the upper portion of the column 3 and facing the load receiver side of the scale. A portion of a main lever 5 of the scale appears in the cut away section at the forward corner of the base 1 as seen in Figure I.

In order that the weight of containers placed on the load receiver 2 may be offset and the weight of the net load in the container indicated on the chart carried within the column 3 a tare weight 6 is mounted on a Z-shaped plate 7 and guided along a track 8 attached to the plate 7. The weight 6 is normally positioned as far as possible from the fulcrum axis of the lever, as determined by fulcrum pivots 9, so that its weight is offset by the load counterbalancing mechanism when the chart indicates zero net load. When a container is placed on the load receiver 2 the tare weight 6 may be moved toward the fulcrum axis of the lever so as to decrease the force it applies to the levers in an amount equal to the load force applied by the weight of the container.

A zero adjusting weight 10 is that threaded on a screw 11 carried in a U-shaped bracket 12 from the lever 5 is used to bring the scale indication exactly to zero when there is no load on the load receiver and the tare adjusting weight 6 is driven to the forward end of its travel.

The tare adjusting mechanism is shown in detail in Figures II to V. The track 8, as seen in Figures II and V, is U-shaped in cross section and extends parallel to the lever 5. The upstanding sides of the track 8, at their ends, journal short shafts 13 and 14 on which sprockets 15 and 16 are mounted. A driving chain 17 having one end hooked over a downwardly directed tongue 18 of a spring clip 19 attached to the tare offsetting weight 6 is trained over the sprockets 16 and 15 and has its other end attached to a tongue of a second spring clip 20 also secured to the weight 6. A flat tension spring 21 held under a screw 22 threaded into the end of the weight 6 above the track 8 has its ends 23 formed to frictionally bear against the side of the track 8 with sufficient force to hold the weight 6 snugly against the track 8 as well as to prevent the weight from sliding along the track during normal operation of the scale. For adjustment of the frictional force, a pair of screws 24 are threaded into the weight 6 before the spring 21 is installed and are accessible through small holes cut in the spring so that they may be backed out of the weight 6 until the screw heads, bearing against the undersurface of the tension spring 21, regulate the force with which the spring 21 acts against the track.

When it is desired to make an adjustment of the position of the tare weight 6, a knob 25 carried on a shaft 26 is pushed axially toward the scale until a bevel gear 27 on the end of the shaft 26 engages similar bevel gear 28 fixedly mounted on the short shaft 14. As soon as the bevel gears 27 and 28 are engaged rotation of the knob 25 driving through the sprocket 16 and chain 17 moves the weight 6 along the track 8.

The shaft 26 is journaled in a bushing 29 that is threaded through a front wall 30 of the base 1 in position so that the point of contact between the beveled gears 27 and 28 is located substantially on the fulcrum axis of the lever 5. The bushing 29 is held in adjusted position by a lock nut 31 threaded onto the bushing and tightened against the wall 30 of the base. This construction is shown in detail in Figures III and IV.

The knob 25 is held on the shaft 26 by a pin 32 fitted radially through a hole in a hub 33 of the knob 25 with its inwardly directed end engaging a conical hole 34 in the shaft 26. A spring 35 attached to the pin 32 and encircling the hub 33 yieldably holds the pin in engagement with the shaft 26. Should the weight 6 be driven against stops at either end of its travel and the knob 25 be turned still further the pin 32 cams out of the conical hole 34 thus permitting relative rotation between the knob 25 and shaft 26. A circumferential groove 36 cut in the shaft 26 forms a guide for the pin 32 during relative rotation of the knob 25 and shaft 26 so that the knob is not easily withdrawn from the shaft.

The bushing 29 adjacent the knob 25 is counterbored to receive a helical compression spring 37 and a spacer 38. The spring 37 urges the knob and shaft assembly axially in a direction to disengage the bevel gears 27 and 28 so that the tare weight driving mechanism cannot interfere with the accuracy of load indication of the scale. When the knob 25 and the shaft 26 are pressed axially to engage the bevel gears 27 and 28 the hub 33 of the knob strikes the end of the bushing 29 just as the bevel gears reach full engagement. This insures that regardless of the amount of pressure applied to the knob 25 lateral force cannot be transmitted through the bevel gears and against the lever 5 of the scale.

This tare offsetting mechanism is easy to install in a weighing scale since the only modification in the weighing scale structure that is required is the drilling and tapping of the hole through the wall 30 of the base 1 to receive the threaded bushing 29. The Z-shaped plate 7 carrying the tare offsetting weight 6 is shaped so that its upper portion may be secured to the lever 5 by the same screws that are used to attach the U-shaped bracket 12 carrying the zero balance weight.

As is customary in any installation in which a sliding weight is movable along a lever, stops are included to limit the travel of the weight 6 and the center of gravity of the weight 6 is located very nearly on the pivot line of the lever 5 so that the load indication of the scale is not affected by the condition of level of the scale. Furthermore, the location of the bevel gears 27 and 28 in line with the fulcrum axis of the lever 5 makes it possible to supply sufficient force to move the tare offsetting weight 6 along its track without having the force applied through the bevel gears affect the indication of load. This follows because any application of lateral force to a lever with the line of action of the force directed through the fulcrum axis does not produce any moment tending to rotate the lever about its fulcrum and therefore does not affect the indication of load. This is an important result in that it permits very rapid adjustment for tare since the weighing scale indication is responsive only to the position of the tare weight and not to the forces moving the weight. Thus one may watch the indicator and easily determine the remaining required movement of the weight as the weight is being moved into tare offsetting position.

The use of bevel gears in the drive and the axial movement of the drive shaft with the adjusting knob makes possible a tare adjusting mechanism that does not affect the accuracy of the indication of load and which is yet instantly available for adjustment whenever adjustment is required.

Various modifications in the specific structure may be made without departing from the spirit and scope of the invention.

I claim:

1. In a tare device for a weighing scale, in combination, a base, a lever fulcrumed on the base, a member mounted on a lever of the scale, the member providing a track parallel to the pivot plane of the lever, a weight mounted on the member for movement along the track, means on the member for moving the weight along the track, said means having a portion adjacent the fulcrum axis of the lever, a shaft extending through and journaled in the base of the scale, said shaft having a portion adjacent the fulcrum axis of the lever, and a disengageable coupling engaged by movement of the shaft for operatively connecting the shaft to said weight moving means, said coupling having its force transmitting portions at the fulcrum axis of the lever whereby substantially no moment is exerted on the lever by force transmitted through the coupling.

2. In a tare device for a weighing scale, in combination, a weighing scale lever, a base on which the lever is fulcrumed, a track on the lever extending parallel to the pivot plane of the lever and transverse to its fulcrum axis, a weight movable along the track, a shaft mounted on the lever and operatively connected to the weight, a drive shaft mounted in the base, said drive shaft being axially movable, a disengageable connection between said shafts, said connection being located on the fulcrum axis of the lever and engaged by axial movement of the drive shaft, and resilient means for urging the drive shaft axially to disengage the connection.

3. In a tare device for a weighing scale, in combination, a weighing scale lever, a base on which the lever is fulcrumed, a track on the lever extending parallel to the pivot plane of the lever and transverse to its fulcrum axis, a weight movable along the track, a shaft mounted on the lever and operatively connected to the weight, a drive shaft mounted in the base, gears mounted on the shafts for operatively connecting the shafts, said shafts being mounted so that the engagement between the gears is substantially on the fulcrum axis of the lever, and resilient means acting axially on said drive shaft for automatically disengaging said gears.

4. In a tare device for a weighing scale, in combination, a weighing scale lever, a base on which the lever is fulcrumed, a track on the lever extending parallel to the pivot plane of the lever and transverse to its fulcrum axis, a weight movable along the track, a shaft mounted on the lever and operatively connected to the weight, a drive shaft slidably and rotatably mounted in the base, said shafts being generally perpendicular to each other, cooperating bevel gears mounted on the shafts, said gears intermeshing generally on the fulcrum axis of the lever, and resilient means acting axially against the drive shaft for urging the shaft in a direction to disengage the bevel gears.

5. In a tare device for a weighing scale, in combination, a weighing scale lever, a base on which the lever is fulcrumed, a track on the lever extending parallel to the pivot plane of the lever and transverse to its fulcrum axis, a weight movable along the track, a shaft mounted on the lever and operatively connected to the weight, a bushing mounted in the base, a drive shaft journaled in the bushing, disengageable driving members for operatively connecting said shafts, said driving members being located on the fulcrum axis of the lever, and a coil spring sleeved over the drive shaft and compressed between a part of the drive shaft and the bushing for disengaging said driving members.

NORMAN E. HART.

REFERENCES CITED

The following references are of record in the file of this patent:

UNITED STATES PATENTS

| Number | Name | Date |
| --- | --- | --- |
| 1,079,495 | Jefferies | Nov. 25, 1913 |
| 1,765,495 | McKim | June 24, 1930 |
| 1,980,731 | Michener | Nov. 13, 1934 |